US011609724B2

(12) United States Patent
Doyle, Sr. et al.

(10) Patent No.: US 11,609,724 B2
(45) Date of Patent: Mar. 21, 2023

(54) APPARATUS AND METHOD FOR METERING AND MONITORING PRINTER RELATED DATA ON NON-NETWORKED PRINTERS

(71) Applicant: EMERGE PRINT MANAGEMENT, LLC, Framingham, MA (US)

(72) Inventors: Daniel Doyle, Sr., Belleair, FL (US); Patrick Adesso, Tampa, FL (US); Jill Castillenti, Dade City, FL (US); Gideon Hecht, Tampa, FL (US); Brian Lauman, Clearwater, FL (US); Scott Robinson, Tampa, FL (US); Daniel Doyle, Jr., Belleair, FL (US)

( * ) Notice: Subject to any disclaimer, the term of this patent is extended or adjusted under 35 U.S.C. 154(b) by 173 days.

(21) Appl. No.: 17/073,883

(22) Filed: Oct. 19, 2020

(65) Prior Publication Data

US 2021/0034307 A1 Feb. 4, 2021

Related U.S. Application Data

(63) Continuation of application No. 15/481,054, filed on Apr. 6, 2017, now Pat. No. 10,809,947.

(60) Provisional application No. 62/318,826, filed on Apr. 6, 2016.

(51) Int. Cl.
| G06F 3/12 | (2006.01) |
| G06F 13/38 | (2006.01) |
| G06F 13/42 | (2006.01) |
| H04L 67/025 | (2022.01) |
| H04L 9/40 | (2022.01) |

(52) U.S. Cl.
CPC .......... *G06F 3/1207* (2013.01); *G06F 3/1229* (2013.01); *G06F 3/1231* (2013.01); *G06F 3/1236* (2013.01); *G06F 3/1284* (2013.01); *G06F 3/1288* (2013.01); *G06F 13/385* (2013.01); *G06F 13/4282* (2013.01); *H04L 9/40* (2022.05); *H04L 67/025* (2013.01)

(58) Field of Classification Search
None
See application file for complete search history.

(56) References Cited

U.S. PATENT DOCUMENTS

| 2002/0169884 A1* | 11/2002 | Jean ...................... H04L 67/563 710/62 |
| 2003/0217110 A1* | 11/2003 | Weiss .................... H04L 69/329 709/201 |
| 2004/0098506 A1* | 5/2004 | Jean ........................ H04L 61/25 709/206 |
| 2006/0150236 A1* | 7/2006 | Sakuda ............... H04L 41/0886 725/135 |
| 2007/0013947 A1* | 1/2007 | Watanabe ............. G06F 3/1229 358/448 |
| 2007/0263621 A1* | 11/2007 | Oshima ................... H04L 67/51 370/389 |

(Continued)

*Primary Examiner* — Duc T Duong

(57) ABSTRACT

This invention relates to an apparatus for monitoring a locally attached printer using the locally attached printer's Ethernet interface. A USB device is installed between a computer and a locally attached non-networked printer and additionally connects to the printer via an Ethernet interface. The USB device uses SNMP (or other network protocols) to manage the printer via the Ethernet interface. The system may then report the management information to a central server.

19 Claims, 3 Drawing Sheets

(56) References Cited

U.S. PATENT DOCUMENTS

| | | | | |
|---|---|---|---|---|
| 2008/0021991 | A1* | 1/2008 | Kawai | H04L 41/00 709/223 |
| 2009/0015854 | A1* | 1/2009 | Ooba | H04N 1/00923 358/1.9 |
| 2009/0180137 | A1* | 7/2009 | Kuwasaki | H04N 1/00 358/1.15 |
| 2010/0027054 | A1* | 2/2010 | Reddy | G06F 3/1236 358/1.15 |
| 2011/0261391 | A1* | 10/2011 | Oba | G06F 3/1284 358/1.15 |
| 2013/0286425 | A1* | 10/2013 | Nakamura | G06F 3/1289 358/1.13 |
| 2014/0298054 | A1* | 10/2014 | Hasui | H04N 1/00217 713/320 |
| 2016/0179153 | A1* | 6/2016 | Cohen | G06F 11/2247 710/16 |
| 2017/0163843 | A1* | 6/2017 | Ma | H04N 1/00204 |
| 2017/0324258 | A1* | 11/2017 | Luo | H02J 7/0029 |

* cited by examiner

APPARATUS AND METHOD FOR METERING AND MONITORING PRINTER RELATED DATA ON NON-NETWORKED PRINTERS

RELATED APPLICATION DATA

This application is a continuation of application Ser. No. 15/481,054, filed Apr. 6, 2017, entitled "Apparatus and Method for Metering and Monitoring Printer Related Data on Non-Networked Printers," issued as U.S. Pat. No. 10,809,947, which claims priority to U.S. Provisional Patent Application Ser. No. 62/318,826, filed Apr. 6, 2016, entitled "Apparatus and Method for Metering and Monitoring Printer Related Data on Non-Networked Printers," the contents of which are fully incorporated by reference herein for all purposes.

TECHNICAL FIELD

This disclosure relates to a computer-implemented system and method for the remote monitoring and reporting of printers and related data. For locally attached printers that also have an Ethernet interface, the system and method may use the Ethernet interface to obtain management information via SNMP queries. A WI-FI interface may also be provided to bridge the SNMP queries to the Ethernet interface. The monitoring information may include page counts, supply status, diagnostics, and the like.

BACKGROUND OF THE INVENTION

Methods for detecting and compiling data relating to printer events generally require gathering information from a printer, typically via software installed on a dedicated computer or computers connected to the printer at issue. These methods suffer from several limitations, including the reliance on network administrators to perform a complex installation protocol, the need for customization, the need for compatibility and functionality within a variety computer operating system environments, the use of a client's hardware and network to gather and report data, and the use of internal client bandwidth to report data.

Applicant has a number of related patents and applications in this field directed to other improved methods for metering and monitoring printer related data on non-networked printers. These include U.S. Pat. No. 8,223,365 entitled "Apparatus and Method for metering and Monitoring Print Usage at Non-Network Printers", U.S. Pat. No. 8,879,091 entitled "Apparatus and Method for Metering, Monitoring and Providing Real Time Enterprise Printing Information", U.S. Pat. No. 8,144,354 entitled "Method for Transforming and Transporting Printer Data Over the Internet in a Secure and Reliable Manner", U.S. Pat. No. 8,330,984 entitled "Field Metering Patrol System and Method for Metering and Monitoring Printers", U.S. Pat. No. 9,314,965 entitled "Patrol Device Field Installation Notification Method and System", U.S. Pat. No. 8,488,175 entitled "Method for Transforming and Transporting Printer Data over the Internet in a Secure and Reliable Manner", U.S. Pat. No. 8,537,402 entitled "Apparatus and Method for Metering and Monitoring Printers", U.S. Ser. No. 61/939,365 entitled "System and Method for the Passive Monitoring and Reporting of Printer-Related Data on USB Cables", U.S. Ser. No. 61/939,274 entitled "System and Method for the Near Field Communication Pairing of Components of a Printer-Related Data Reporting System", U.S. Ser. No. 61/939,388 entitled "System and Method for the Barcode Pairing of Components of a Printer-Related Data Reporting System", U.S. Ser. No. 61/939,403 entitled "System and Method for Monitoring Printer-Related Data on USB Cables", and U.S. Ser. No. 61/939,419 entitled "System and Method for the Passive Monitoring and Reporting of Network Content on USB Cables." Each of the above listed patents and applications is incorporated herein by reference.

Simple Network Management Protocol (SNMP) is an Internet-standard protocol for collecting and organizing information about managed devices on IP networks and for modifying that information to change device behavior. Devices that typically support SNMP include routers, switches, servers, workstations, printers, modem racks, and more. SNMP is widely used in network management systems to monitor network-attached devices for conditions that warrant administrative attention. SNMP exposes management data in the form of variable on the managed systems, which describe the system configuration. These variables can then be queried by managing applications. The cost of monitoring and metering SNMP data can be high because it must normally allow for other traffic other than SNMP data.

A need exists in the industry for continued improvement in metering and monitoring printer related information, particularly on non-networked printers.

SUMMARY OF THE INVENTION

This disclosure provides for a system and method for monitoring locally attached printers.

An advantage of the present disclosure is the ability to reduce the cost of monitoring locally attached printers using SNMP via the locally attached printers' Ethernet interface.

Another advantage of the present disclosure is to use a WI-FI network to receive SNMP queries from and send SNMP responses to an SNMP Manager.

Additional advantages are apparent to one of skill in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present invention relates to a system and method for monitoring locally attached printers using the locally attached printer's Ethernet interface. For purposes of the following discussion, locally attached means that the device is connected to other computing components through a non-networked interface, such as via USB or some other local connection. The computer may be connected (and preferably is connected) to a network but the printer is not directly connected to the network. The present disclosure may also apply to other locally attached devices that include an Ethernet interface, but the discussion that follows is focused only on locally attached printers.

In a typical environment, a non-networked printer is connected to a computer via a USB printer cable. The USB printer cable typically has a USB-A adapter on one end and a USB-B adapter on the opposite end. The USB-A adapter is connected to a USB port on a computer, while the USB-B adapter is connected to a USB port on the printer.

Printers also come standard with numerous interfaces for connecting to computers and networks in a number of ways. Those printers that come with an Ethernet interface are able to communicate via the Ethernet interface using standard protocols (such as TCP/IP and the like). Generally, such printers include software (or firmware) to enable the printers to manage certain activities, including logging onto a network, gaining an IP address, and perhaps running a web-server (or other interface) to enable management of the printer. Where such a printer is locally attached to a computer via a USB interface, these features are not utilized.

The present disclosure provides for connecting the printer to a computer via a USB interface, but also using the functionality provided with the printer's Ethernet interface. As disclosed in some of Applicant's prior patent applications and patents, a printer monitor can be installed between the printer and the computer on the USB connection. These USB devices can pass information between the printer and the computer to enable printer management and reporting.

Figure 1:
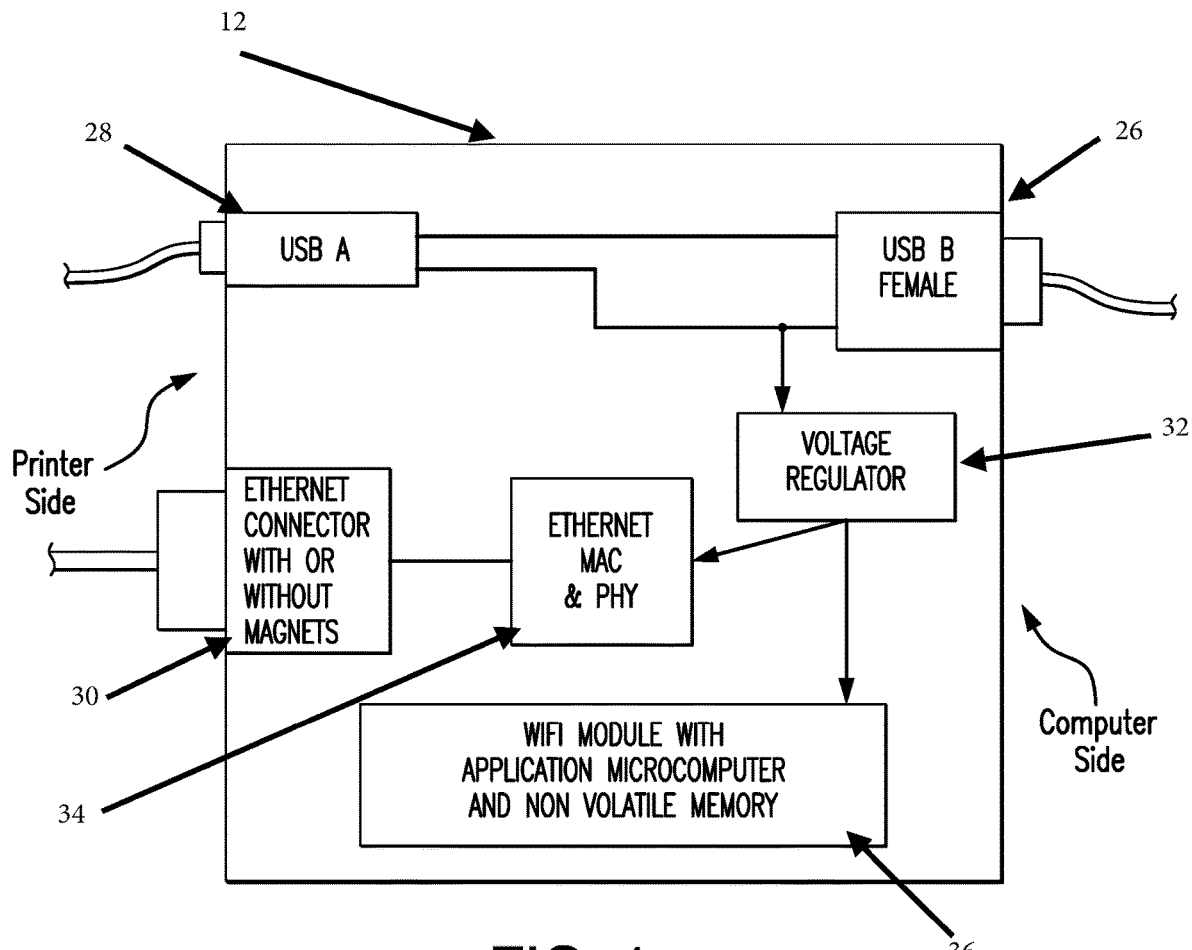
FIG. 1 is a block diagram depicting components of an embodiment of the present invention.

The present disclosure provides for an improvement to such print monitors. An exemplary block diagram of a USB device 12 for managing printer information that may be installed between the printer 20 and the computer 18 is shown in FIG. 1. This block diagram includes many components of the present disclosure. Other components may also be included (for instance non-volatile memory). The USB device 12 preferably includes a first USB interface 26 and a second USB interface 28. Preferably, the first USB interface 26 is a female USB-B port, designed to receive the USB-B side of a typical USB printer cable. Preferably, the second USB interface 28 is a female USB-A port, designed to receive the USB-A side of a typical USB printer cable. These interfaces are used to connect the USB device 12 to the computer on one hand through the first USB interface 26, and the printer 20 on the other through the second USB interface 28. This way printer commands can be passed from the computer 18 to the printer 20 via the USB interfaces 26 and 28, and such commands will pass through the USB device 12. The USB device 12 will preferably just pass the USB data through the device, and use the USB connection to power the device 12. A voltage regulator 32 is preferably included on the device 12.

The USB device 12 also preferably includes an Ethernet interface 30. This Ethernet interface 30 may include any standard Ethernet connector, for instance CAT5. The USB device 12 also preferably includes a WIFI module 36 for wireless communication as described below. In a preferred embodiment, the USB device 12 also includes a status indicator 38 to aid in installation and management of the USB device 12. The USB device 12 additionally includes an Ethernet Media Access Control (MAC) and PHYsical connection (PHY) 34 in order to encode and decode data traveling through the Ethernet interface 30.

Figure 2:
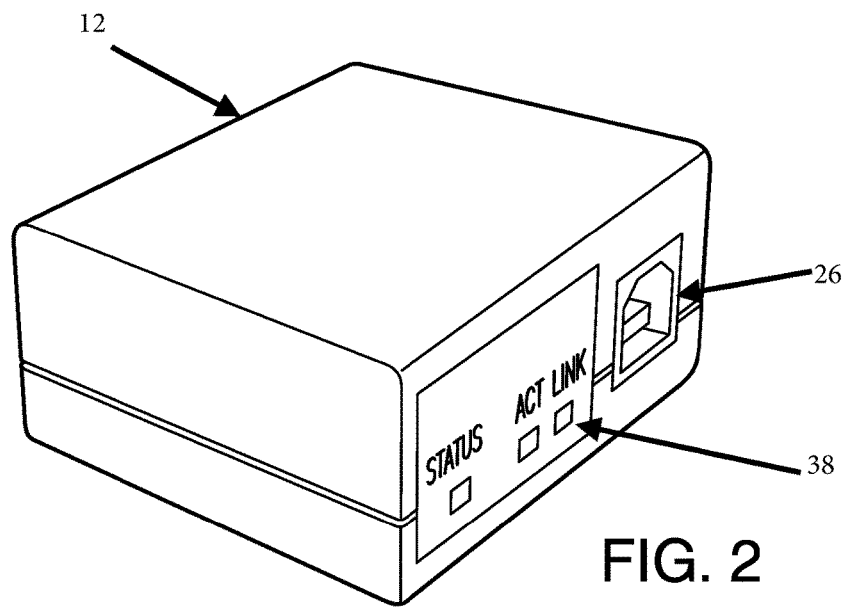
FIG. 2 is a rendering depicting components of an embodiment of the present disclosure.

FIG. 2 depicts the USB device 12 from a first angle, showing the first USB interface 26. As shown, the first USB interface 26 is preferably a female USB-B port. Additionally, FIG. 2 shows a preferred status indicator 38. In one embodiment, the status indicator includes one or more LED indicator lights to show various management information about the USB device 12, including whether the device is receiving power, whether it has a network connection, what its status is, what data is passing through the device, and any other status information that may aid in the management of the USB device 12.

Figure 3:
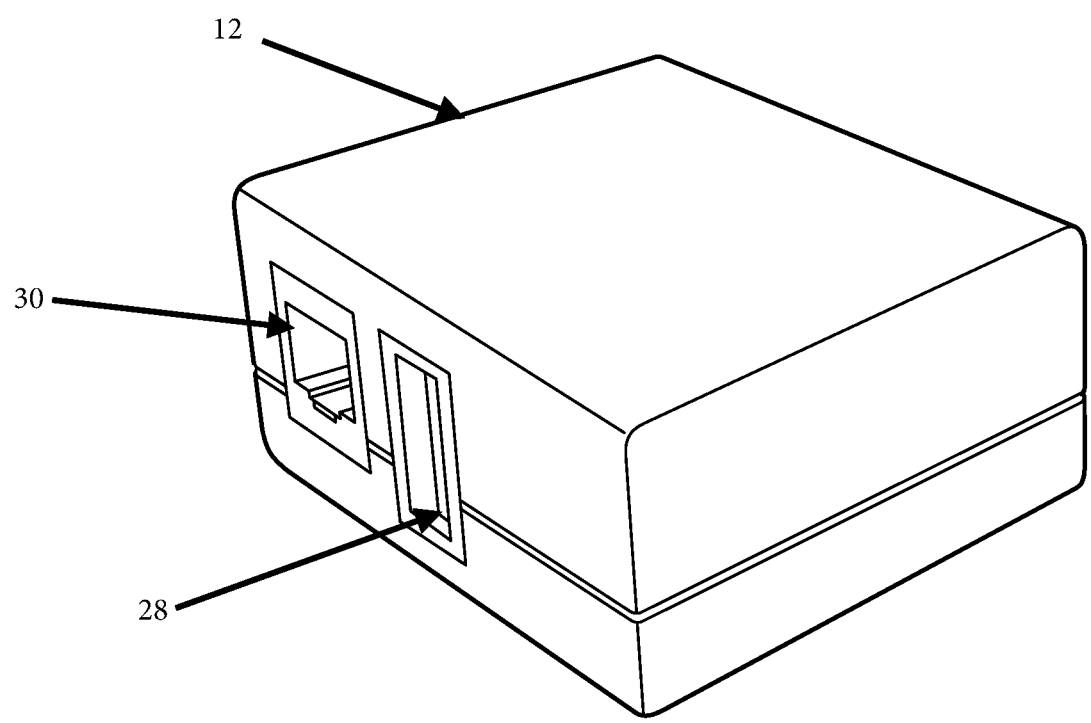
FIG. 3 is a rendering depicting components of an embodiment of the present disclosure.

FIG. 3 depicts the USB device 12 from a second angle, showing the second USB interface 28 and the Ethernet interface 30. In a preferred embodiment, the first USB interface 26 is on a side opposite from the second USB interface 28 and Ethernet interface 30.

Figure 4:
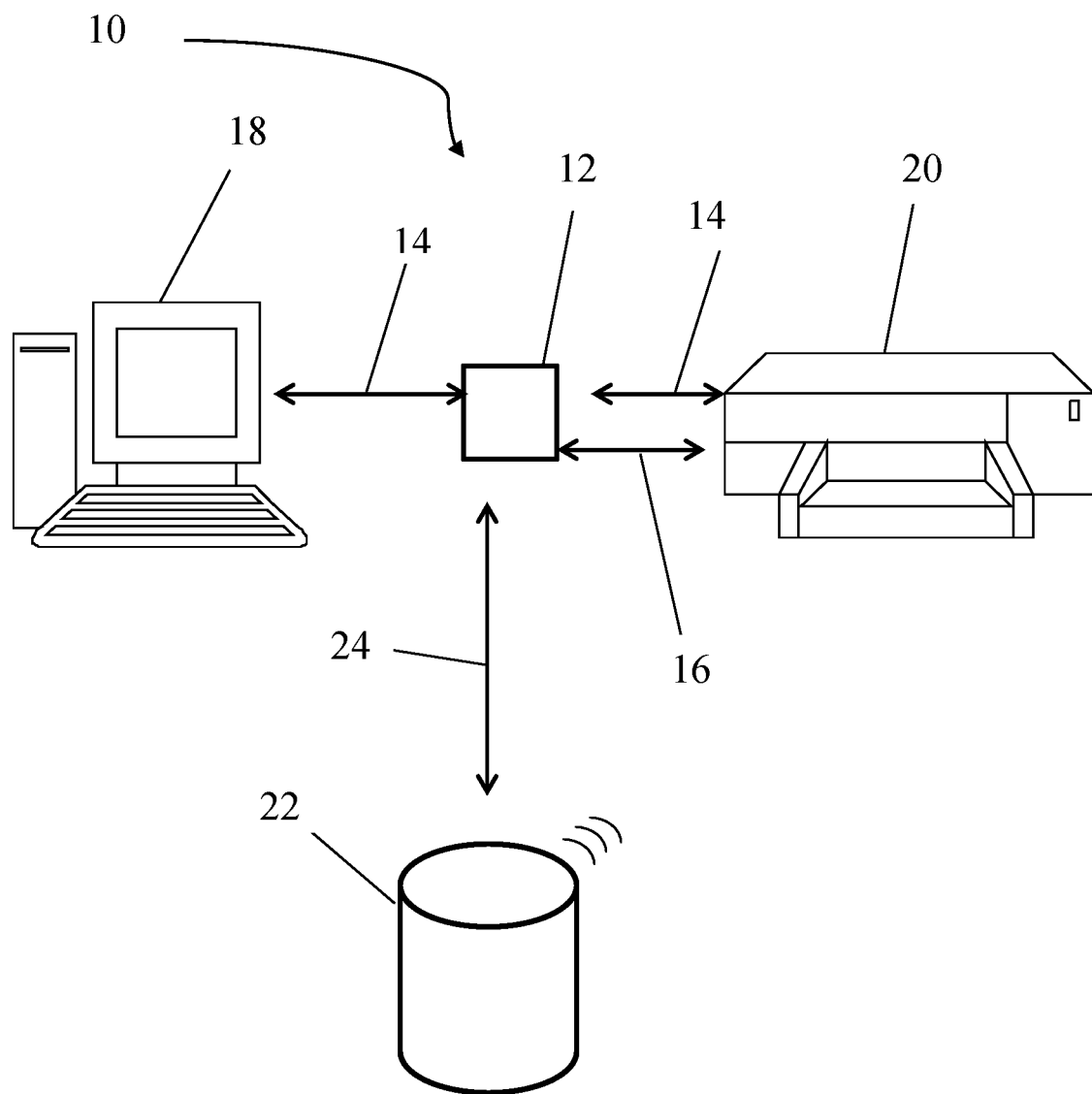
FIG. 4 is a diagram depicting the various components of an embodiment of the present invention.

FIG. 4 depicts the associated system 10 including the USB device 12 installed between a computer 18 and a printer 20. Notably, the USB device 12 is connected to the computer 18 via a USB cable 14 and is also connected to the printer 20 via a separate USB cable 14. One of the USB cables 14 is connected between the first USB interface 26 and the computer 18. The other USB cable 14 is connected between the second USB interface 28 and the printer 20. The USB device 12 gathers printer related information and may report that printer related information to a centralized server 22. In a preferred embodiment, the USB device 12 communicates with the centralized server 22 via a network 24. This network 24 may be a wireless network.

The USB device 12 additionally connects to the printer 20 via the printer's Ethernet interface. This connection is shown via the Ethernet cable 16. In this fashion, the USB device 12 uses the Ethernet interface of the printer (and associated protocols, including SNMP) to gather, manage, and report on additional information provided by the printer.

The printer 20 with an Ethernet interface will serve as an SNMP agent, while the USB device 12 acts as the SNMP Manager. In this fashion, the USB device 12 can receive network management information from the printer and either use that network management information to aid in managing the printer, or simply pass along that information to the central server 22 for other purposes.

In a preferred embodiment, the system 10 will use or implement the following functionality:

The system 10 can connect to a WIFI Access Point via the WIFI module 36 in the USB device 12. The system 10 will also connect to a printer 20 via the Ethernet connector. Firmware on the USB device 12 will act as a server on this Ethernet interface 30 in order to communicate with the printer 20. Functionality provided by this USB device 12 provided server will include acting as a DHCP (Dynamic Host Control Protocol) server to the printer 20 so that the printer 20 may request (and receive) an IP address to use in communicating with the USB device 12 over the Ethernet interface 30.

The USB device 12 may also act as a webserver to facilitate configuration. For example, the USB device 12 may allow a device to connect via any interface (preferably the Ethernet interface 30) to enable configuring the USB device 12. This webserver may provide diagnostic information as well, including the type of device, firmware version, manufacturer, and other information.

The USB device 12 is preferably configured to pass SNMP traffic between the network and the printer without monitoring or touching the SNMP content. The USB device 12 preferably changes the IP address and MAC address of the SNMP packets between the WIFI network and Ethernet interface 30. Preferably these changes are made in both directions. In a preferred embodiment, SNMP traffic is blocked on the WIFI interface when that traffic is from non-authorized equipment.

The USB device 12 is also preferably configured to respond to various networking protocols and requests, including ping packets on both the WIFI and Ethernet interfaces. The USB device 12 may also preferably be upgraded (for instance via an update to the firmware) via the WIFI network 24. And the USB device 12 preferably blocks certain WIFI traffic.

The system 10 can preferably work with all forms of WIFI security, including open, WEP, WPA/WPA2 Personal, WPA/WPA2 Enterprise, and any other WIFI security types currently known in the art or yet to be developed.

The configuration interface of the system allows for various settings including, but not limited to, security type, network name, security key, passphrase, security method, user name/password, and anonymous name for WPA/WPA2 Enterprise. The system also allows for storage of certificates in the non-volatile memory of the WIFI module 36 for the purposes of server identification, storage of private keys for purposes of client identification, and display of system information such as the firmware build number and date as well as the IP addresses of the Ethernet connection and the WIFI module 36 for diagnostic purposes.

The USB device 12 is preferably configured to initialize by searching for available wireless networks to join. In one embodiment, the USB device 12 may come preconfigured with one or more wireless networks to join. In another embodiment, the USB device may be able to be configured via any of its ports to join a wireless network. Alternatively, the USB device 12 may be connected to a wired network via one of its ports in order to be configured.

In operation, the Ethernet interface 30 is the primary interface for communicating with the printer 20. The WIFI module 36 may be used for a remote server (called Patrol in a preferred implementation) to query status and/or metric information from the printer 20. In that regard, the WIFI module 36 is a wireless extension (pipe) for the remote server to communicate with the printer 20. The remote server can initiate SNMP queries from the printer 20 through the USB device 12. In a preferred implementation, the remote server first establishes a verified connection with the USB device 12 via the WIFI module 36. This verified connection may include a secure key handshake between the USB device 12 and the remote server. The WIFI module 36 wireless extension (pipe) can be opened to allow a third party to be verified and allow that third party application access to printer SNMP data traffic or other data traffic.

It will be understood by those of skill in the art that flowcharts and block diagrams herein described may illustrate architecture, algorithms, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A device for monitoring a non-networked printer, the device comprising:
   a first USB interface
   a second USB interface;
   an Ethernet port, the device being connected to the non-networked printer at the Ethernet port;
   a wireless network interface;
   an Ethernet circuit configured to receive printer-related device information using a SNMP network protocol to communicate with the non-networked printer via the Ethernet port; and
   a WIFI circuit configured to receive instructions from a remote server via the wireless interface to initiate network protocol queries via the Ethernet circuit.

2. The device of claim 1 wherein the WIFI circuit is further configured to return SNMP data to the remote server.

3. The device of claim 1 wherein the first USB interface is a female USB port.

4. The device of claim 3 wherein the female USB port is a USB-B port.

5. The device of claim 1 wherein the second USB interface is a female USB port.

6. The device of claim 5 wherein the female USB port is a USB-A port.

7. The device of claim 1 further comprising:
   a voltage regulator configured to regulate power supply on the first USB interface in order to provide power to the device.

8. The device of claim 1 further comprising:
   a status indicator.

9. The device of claim 1 wherein the second module further comprises:
   an Ethernet MAC and PHY.

10. The device of claim 1 wherein the device receives power via the first USB interface.

11. The device of claim 1 further comprising:
    a power supply.

12. The device of claim 11 wherein the device does not receive power via the first USB interface.

13. A system for monitoring a non-networked printer comprising:
    a non-networked printer;
    a centralized server; and
    a print-monitoring device, the print monitoring device comprising:
       a first USB interface;
       a second USB interface;
       an Ethernet port, the print monitoring device being connected to the non-networked printer at the Ethernet port;
       an Ethernet circuit configured to receive an instruction from the centralized server and in response to the instruction performing a SNMP network protocol query on the non-networked printer via the Ethernet port; and
       the Ethernet circuit further configured to return printer-related data to the centralized server wherein the printer-related data is returned in response to the SNMP network protocol query.

14. The system of claim 13 wherein a computer is connected to the print-monitoring device via the first USB interface.

15. The system of claim 13 wherein the non-networked printer is connected to the print-monitoring device at the second USB interface and at the Ethernet port.

16. The system of claim 13 wherein the print-monitoring device communicates with the central server via a network.

17. The system of claim 13 wherein the print-monitoring device communicates with the central server via a wireless network.

18. The system of claim 13 wherein the print-monitoring device further comprises a WIFI module.

19. The system of claim 13, wherein the print monitoring device further comprises:
   a voltage regulator configured to regulate power supply on the first USB interface in order to provide power to the print monitoring device.

\* \* \* \* \*